(12) United States Patent
Nakayama et al.

(10) Patent No.: US 12,738,785 B2
(45) Date of Patent: Sep. 15, 2026

(54) MOTOR ROTOR WITH INNER SLEEVE

(71) Applicants: IHI Corporation, Tokyo (JP); NHK SPRING CO., LTD., Yokohama (JP)

(72) Inventors: Shun Nakayama, Tokyo (JP); Yuji Sasaki, Tokyo (JP); Yoshihito Katsu, Tokyo (JP); Koji Sakota, Tokyo (JP); Yoshikazu Mineda, Yokohama (JP)

( * ) Notice: Subject to any disclaimer, the term of this patent is extended or adjusted under 35 U.S.C. 154(b) by 184 days.

(21) Appl. No.: 18/760,045

(22) Filed: Jul. 1, 2024

(65) Prior Publication Data

US 2024/0356407 A1 Oct. 24, 2024

Related U.S. Application Data

(63) Continuation of application No. PCT/JP2022/036574, filed on Sep. 29, 2022.

(30) Foreign Application Priority Data

Jan. 6, 2022 (JP) ................................ 2022-000804

(51) Int. Cl.
*H02K 1/28* (2006.01)
*H02K 1/27* (2022.01)
(Continued)

(52) U.S. Cl.
CPC ................ *H02K 1/28* (2013.01); *H02K 1/27* (2013.01); *H02K 1/278* (2013.01); *F02M 35/10* (2013.01);
(Continued)

(58) Field of Classification Search
CPC .......... H02K 1/27; H02K 1/2733; H02K 1/28; H02K 15/16; H02K 7/14; H02K 1/278; H02K 15/165; H02K 7/04; H02K 1/30; H02K 21/14; H02K 15/03; F04D 25/06; F04D 29/284; F02M 35/10
(Continued)

(56) References Cited

U.S. PATENT DOCUMENTS

2019/0165629 A1* 5/2019 Ozasa ..................... H02K 1/30

FOREIGN PATENT DOCUMENTS

JP H6-153427 5/1994
JP 2010-200456 9/2010
(Continued)

OTHER PUBLICATIONS

Shimizu Masahiro, Motor Rotor, Sep. 9, 2010, JP 2010200456 (English Machine Translation) (Year: 2010).*
(Continued)

*Primary Examiner* — Alexander A Singh
(74) *Attorney, Agent, or Firm* — SHIPWAY IP

(57) ABSTRACT

A rotor includes a shaft, a magnet located around the shaft, an inner sleeve located around the shaft and between the shaft and the magnet, and an end ring located around the inner sleeve and positioned adjacent to the magnet. The inner sleeve includes a holding portion having an inner diameter that surrounds and holds the shaft, and a gap forming portion including a first inner diameter that is larger than the inner diameter of the holding portion, such that the gap forming portion is spaced apart from the shaft. A part of the magnet is located on the holding portion. The end ring is located on the gap forming portion.

20 Claims, 12 Drawing Sheets

(51) Int. Cl.

| | |
|---|---|
| ***H02K 1/278*** | (2022.01) |
| *F02M 35/10* | (2006.01) |
| *F04D 25/06* | (2006.01) |
| *F04D 29/28* | (2006.01) |
| *H02K 1/30* | (2006.01) |
| *H02K 7/04* | (2006.01) |
| *H02K 15/03* | (2006.01) |
| *H02K 15/165* | (2025.01) |

(52) U.S. Cl.
CPC ............ *F04D 25/06* (2013.01); *F04D 29/284* (2013.01); *H02K 1/30* (2013.01); *H02K 7/04* (2013.01); *H02K 15/03* (2013.01); *H02K 15/165* (2013.01)

(58) Field of Classification Search
USPC ............ 310/156.01, 156.08, 156.28, 156.29, 310/156.31
See application file for complete search history.

(56) References Cited

FOREIGN PATENT DOCUMENTS

| | | | | |
|---|---|---|---|---|
| JP | 2010200456 | A | * | 9/2010 |
| WO | 2018/021104 | | | 2/2018 |

OTHER PUBLICATIONS

International Search Report dated Nov. 8, 2022 for PCT/JP2022/036574.
International Preliminary Report on Patentability with Written Opinion dated Jul. 18, 2024 for PCT/JP2022/036574.

* cited by examiner

MOTOR ROTOR WITH INNER SLEEVE

CROSS-REFERENCE TO RELATED APPLICATIONS

This application is a continuation application of PCT Application No. PCT/JP2022/036574, filed on Sep. 29, 2022, which claims the benefit of priority from Japanese Patent Application No. 2022-000804, filed On Jan. 6, 2022. The entire contents of the above listed PCT and priority applications are incorporated herein by reference.

BACKGROUND

Field

The present disclosure relates to a motor rotor.

Description of the Related Art

Japanese Unexamined Patent Application Publications No. 2010-200456 and H6-153427 disclose an electrical turbocharger rotates an impeller by means of a motor. The motor includes a rotor and a stator. By the rotor rotating, the impeller rotates.

Increasing the performance of the motor may affect the rotation balance of the rotor included in the motor. The rotation balance of the rotor is affected by the accuracy of the shapes of the components constituting the rotor and the accuracy of the assembly of the components. Furthermore, efforts to improve the accuracy of shape and the accuracy of assembly may result in additional processing and assembly operations.

SUMMARY

Disclosed herein is an example motor rotor that includes: an inner sleeve including a holding portion configured to hold a shaft having a rotation axis and a gap portion including a portion configured not to contact the outer peripheral surface of the shaft; a magnet having a cylindrical shape provided with a magnet through hole into which the inner sleeve is inserted, the inner sleeve being placed in the magnet through hole; and an end ring including an end ring through hole in which the inner sleeve is placed and an end ring end surface configured to face an end surface of the magnet, the inner sleeve being press-fitted into the end ring through hole. The holding portion and the gap portion are individually provided with through hole portions communicating with each other in an insertion manner, the shaft being to be placed in the through hole portions. The inner diameter of the through hole portion provided in the gap portion is larger than the inner diameter of the through hole portion provided in the holding portion. The end ring is placed on the gap portion.

BRIEF DESCRIPTION OF THE DRAWINGS

FIG. 3 is a cross-sectional view of an inner sleeve included in the rotor of FIG. 2.

DETAILED DESCRIPTION

Figure 1:
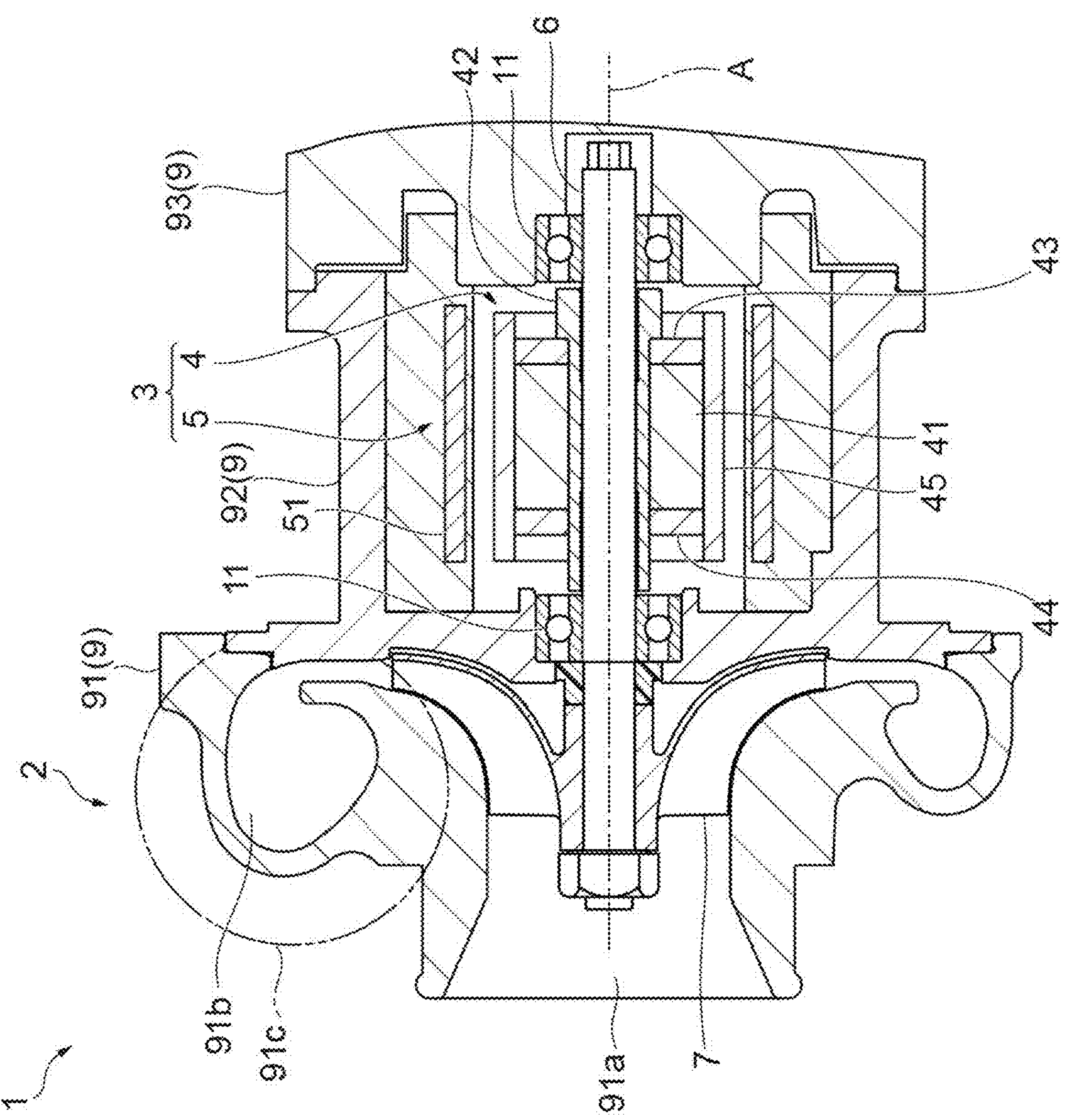
FIG. 1 is a cross-sectional view of an electrical turbocharger including an example rotor.

An example motor rotor may include: an inner sleeve including a holding portion configured to hold a shaft having a rotation axis and a gap portion including a portion configured not to contact the outer peripheral surface of the shaft; a magnet having a cylindrical shape provided with a magnet through hole into which the inner sleeve is inserted, the inner sleeve being placed in the magnet through hole; and an end ring including an end ring through hole in which the inner sleeve is placed and an end ring end surface configured to face an end surface of the magnet, the inner sleeve being press-fitted into the end ring through hole. The holding portion and the gap portion are individually provided with through hole portions communicating with each other in an insertion manner, the shaft being to be placed in the through hole portions. The inner diameter of the through hole portion provided in the gap portion is larger than the inner diameter of the through hole portion provided in the holding portion. The end ring is placed on the gap portion.

The end ring is press-fitted onto the inner sleeve. The inner sleeve that has undergone press-fitting is slightly deformed such that the inner diameter of the hole decreases. The end ring is placed on the gap portion of the inner sleeve. The gap portion includes a portion that is not in contact with the outer peripheral surface of the shaft. The inner diameter of the gap portion is larger than the inner diameter of the holding portion that holds the shaft. As a result, when, due to the press-fitting of the end ring, deformation occurs such that the diameter of the through hole in which the shaft is placed decreases, a situation where the deformed part protrudes further inward than the inner peripheral surface of the holding portion is suppressed. The deformed part does not come into contact with the outer peripheral surface of the shaft. Therefore, the deformation caused by the press-fitting of the end ring can be tolerated. Furthermore, the shaft can be held by the holding portion as intended at the time of design. In some examples, the production of the rotor can be efficiently achieved by avoiding the step of removing a deformed part.

The above motor rotor may further include an armor ring configured to cover the outer peripheral surface of the magnet and the outer peripheral surface of the end ring. The armor ring protects the magnet. As a result, the allowable rotation rate can be increased.

An end surface of the armor ring of the above motor rotor may protrude in the direction of the rotation axis more than an end surface of the end ring. In this configuration, part of the protruding portion of the end surface of the armor ring is cut off. As a result, the rotation balance of the motor rotor can be improved. Therefore, the allowable rotation rate can be increased.

The inner sleeve of the above motor rotor may include: a sleeve main body including a magnet placement surface on which the magnet is placed and an end ring placement surface on which the end ring is placed; and a sleeve flange including an abutment surface configured to face an end surface of the end ring. The end ring placed on the sleeve main body abuts against the abutment surface of the sleeve flange. Therefore, the position of the end ring and the position of the magnet along the rotation axis direction can be easily positioned.

The outer peripheral surface of the sleeve flange of the above motor rotor may be a cylindrical surface. The outer diameter of the sleeve flange may be smaller than the outer diameter of the magnet. In this configuration, leakage of the magnetic path generated by the magnet can be reduced.

The outer peripheral surface of the holding portion of the above motor rotor may include the magnet placement surface. Also in this configuration, the deformation caused by the press-fitting of the end ring can be tolerated well.

The outer peripheral surface of the gap portion of the above motor rotor may include the magnet placement surface, the end ring placement surface, and the outer peripheral surface of the sleeve flange. Also in this configuration, the deformation caused by the press-fitting of the end ring can be tolerated well.

In the above motor rotor, the thickness from the inner peripheral surface of the through hole portion provided in the holding portion to the magnet placement surface may be larger than the thickness from the inner peripheral surface of the through hole portion provided in the gap portion to the magnet placement surface. Also in this configuration, the deformation caused by the press-fitting of the end ring can be tolerated well.

In the above motor rotor, the thickness from the inner peripheral surface of the through hole portion provided in the sleeve flange and communicating with the through hole portion of the gap portion to the outer peripheral surface of the sleeve flange may be larger than the thickness from the inner peripheral surface of the through hole portion provided in the holding portion to the magnet placement surface. The outer peripheral surface of the sleeve flange may be formed by a part of the outer peripheral surface of the gap portion. Also in this configuration, the deformation caused by the press-fitting of the end ring can be tolerated well.

The material of the inner sleeve of the above motor rotor may be a non-magnetic substance.

An example rotor production method may include: an operation of preparing an inner sleeve including a holding portion configured to hold a shaft having a rotation axis and a gap portion including a portion configured not to contact with the outer peripheral surface of the shaft; an operation of placing, on the inner sleeve, a magnet having a cylindrical shape provided with a magnet through hole into which the inner sleeve is inserted; and an operation of press-fitting, onto the inner sleeve, an end ring including an end ring through hole in which the inner sleeve is placed and an end ring end surface configured to face an end surface of the magnet. In the operation of placing the magnet on the inner sleeve, the magnet is placed on the holding portion. In the operation of press-fitting the end ring onto the inner sleeve, the end ring is placed on the gap portion.

Accordingly, some example motor rotor production methods do not include removing the part deformed by the press-fitting of the end ring. Therefore, the production of the rotor can be efficiently achieved.

The above production method may further include, after the operation of placing the magnet on the inner sleeve and the operation of press-fitting the end ring onto the inner sleeve, an operation of placing an armor ring configured to cover the outer peripheral surface of the magnet and the outer peripheral surface of the end ring. By this operation, a motor rotor capable of increasing the allowable rotation rate can be produced.

The above production method may further include, after the operation of placing the magnet on the inner sleeve and the operation of press-fitting the end ring onto the inner sleeve, an operation of grinding an end surface of the inner sleeve. By this operation, the deformation of the end surface of the inner sleeve caused by the press-fitting of the end ring can be removed. Therefore, reductions in the accuracy of the shapes of the components constituting the rotor can be suppressed.

An example motor may include the above example motor rotor and a stator including a coil placed to surround the motor rotor. Since the motor includes the above motor rotor, in some examples the number of operations required for production can be reduced. As a result, the production cost of the motor can be reduced.

An example electrical turbocharger may include: a motor including the above example motor rotor and a stator including a coil placed to surround the motor rotor; and an impeller configured to be driven by the motor. Since the electrical turbocharger includes the above motor rotor, in some examples the number of operations required for production can be reduced. As a result, the production cost of the electrical turbocharger can be reduced.

In the following description, with reference to the drawings, the same reference numbers are assigned to the same components or to similar components having the same function, and overlapping description is omitted.

Hereinbelow, a motor rotor, a motor rotor production method, a motor, and an electrical turbocharger of the present disclosure are described in detail with reference to the appended drawings. In the description of the drawings, the same elements are marked with the same reference numerals, and a repeated description is omitted.

FIG. 1 shows an electrical turbocharger 1 including an example motor rotor. In the following description, the motor rotor is simply referred to as a "rotor 4". The electrical turbocharger 1 is used for, for example, an internal combustion engine of a vehicle or a ship. The electrical turbocharger 1 includes a compressor 2. The electrical turbocharger 1 includes a motor 3 of an embedded permanent magnet type. The motor 3 includes a rotor 4 and a stator 5. The motor 3 generates torque by interaction between the rotor 4 and the stator 5. The torque is transmitted to the compressor 2 via a shaft 6 to which the rotor 4 is attached.

When the compressor 2 is driven by the torque, a fluid such as air is compressed. As a result, the compressor 2 discharges compressed air.

The electrical turbocharger 1 includes the shaft 6 and an impeller 7. The shaft 6 is provided rotatably with respect to a housing 9. The shaft 6 is provided in the housing 9. Both ends of the shaft 6 are supported by two bearings 11. The bearing 11 is press-fitted onto the shaft 6. The bearing 11 rotatably supports the shaft 6 with respect to the housing 9. The bearings 11 are provided individually near the distal end and the proximal end of the shaft 6. The bearings 11 support the shaft 6 on both sides. The bearing 11 is, for example, a radial ball bearing of a grease lubrication type. The bearing 11 may be a deep groove ball bearing. The bearing 11 may be an angular ball bearing. The shaft 6 rotates about a straight-lined rotation axis A. The impeller 7 is attached to the distal end of the shaft 6.

The housing 9 includes a compressor housing 91, a motor housing 92, and a base housing 93. The compressor housing 91 houses the impeller 7. The compressor housing 91 includes a suction port 91*a*, a scroll flow path 91*b*, and a discharge port 91*c*. The motor housing 92 houses the rotor 4 and the stator 5. The base housing 93 closes an opening on the other end side (the right side in the drawing) of the motor housing 92.

The rotor 4 is fixed to the center in the axial direction of the shaft 6. The rotor 4 includes one or a plurality of magnets 41. The stator 5 includes a coil 51 to which an alternating current is provided. The coil 51 is placed to surround the rotor 4.

When an alternating current is provided to the stator 5, an interaction between the rotor 4 and the stator 5 occurs. By this interaction, the shaft 6 and the impeller 7 rotate integrally. When the impeller 7 rotates, the impeller 7 sucks in the outside air through the suction port 91*a*. The sucked-in air is compressed, and is then discharged from the discharge port 91*c*. The compressed air discharged from the discharge port 91*c* is supplied to, for example, an internal combustion engine.

As illustrated in FIG. 1, the rotor 4 forms a synchronous motor of a revolving field magnet type (surface permanent magnet motor, SPM motor) in cooperation with the stator 5.

Figure 2:
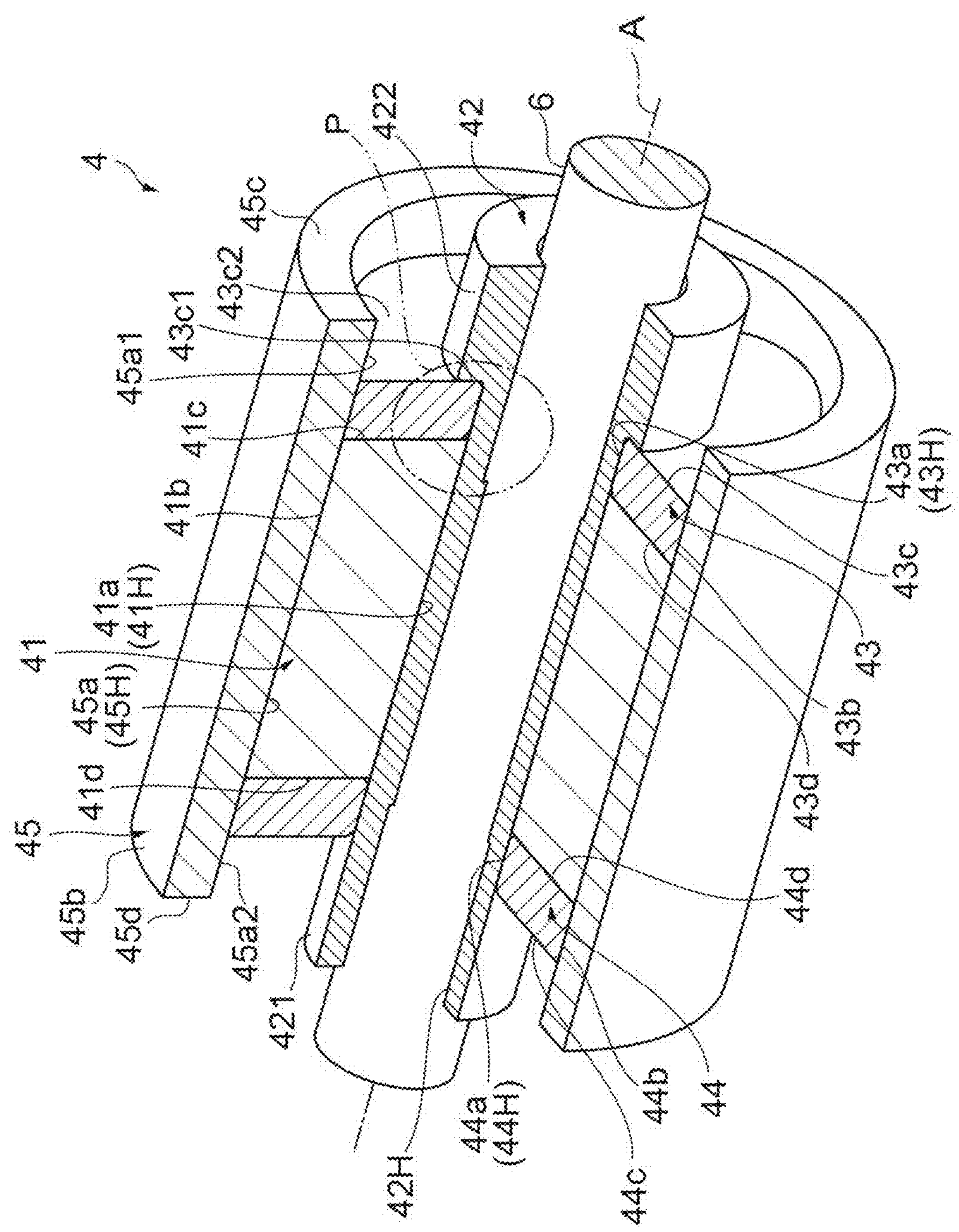
FIG. 2 is a perspective view illustrating a structure of the rotor of FIG. 1.

FIG. 2 is a perspective view of the rotor 4. The rotor 4 includes, as main constituent elements, a magnet 41, an inner sleeve 42, a first end ring 43, a second end ring 44, and an armor ring 45.

The shape of the magnet 41 is a cylinder. The magnet 41 may be a neodymium magnet or a samarium-cobalt magnet. The magnet 41 has a magnet through hole 41H. The inner sleeve 42 is placed in the magnet through hole 41H. The magnet 41 has a magnet inner peripheral surface 41*a*, a magnet outer peripheral surface 41*b*, a first magnet end surface 41*c*, and a second magnet end surface 41*d*.

The magnet inner peripheral surface 41*a* defines the magnet through hole 41H. The magnet inner peripheral surface 41*a* is fixed to the outer peripheral surface of the inner sleeve 42. The magnet inner peripheral surface 41*a* may be bonded to the outer peripheral surface of the inner sleeve 42. The magnet outer peripheral surface 41*b* is fixed to the armor ring 45. The magnet outer peripheral surface 41*b* may be bonded to the armor ring 45. The first magnet end surface 41*c* faces the first end ring 43. The first magnet end surface 41*c* may be fixed to the first end ring 43. The first magnet end surface 41*c* may simply be in contact with the first end ring 43. The second magnet end surface 41*d* faces the second end ring 44. Similar to the first magnet end surface 41*c*, the second magnet end surface 41*d* may be fixed to the second end ring 44. The second magnet end surface 41*d* may simply be in contact with the second end ring 44.

The shape of the first end ring 43 is a circular plate. The first end ring 43 is formed of a non-magnetic substance. The first end ring 43 may be formed of a titanium alloy. The outer diameter of the first end ring 43 is almost the same as the outer diameter of the magnet 41. The inner diameter of the first end ring 43 is almost the same as the inner diameter of the magnet 41. The inner diameter of the first end ring 43 does not strictly coincide with the inner diameter of the magnet 41. The length of the first end ring 43 along the rotation axis A is shorter than the length of the magnet 41 along the rotation axis A.

The first end ring 43 has an end ring through hole 43H. The inner sleeve 42 is placed in the end ring through hole 43H. The relationship between the inner diameter of the end ring through hole 43H and the outer diameter of a sleeve main body 421 of the inner sleeve 42 is what is called an interference fit. The first end ring 43 has an end ring inner peripheral surface 43*a*, an end ring outer peripheral surface 43*b*, an outer end ring end surface 43*c*, and an inner end ring end surface 43*d*.

The end ring inner peripheral surface 43*a* defines the end ring through hole 43H. The end ring inner peripheral surface 43*a* is fixed to the outer peripheral surface of the inner sleeve 42. Unlike the magnet 41, the end ring inner peripheral surface 43*a* is pressed against the outer peripheral surface of the inner sleeve 42.

The end ring outer peripheral surface 43*b* is fixed to the armor ring 45. The end ring outer peripheral surface 43*b* may be pressed against the armor ring 45. The inner end ring end surface 43*d* faces the first magnet end surface 41*c*. The outer end ring end surface 43*c* includes a facing region 43*c*1 and an exposed region 43*c*2. The facing region 43*c*1 faces a sleeve flange 422 of the inner sleeve 42. The exposed region 43*c*2 is exposed from the sleeve flange 422 without facing the sleeve flange 422. The area of the facing region 43*c*1 is smaller than the area of the exposed region 43*c*2. By such a configuration, a situation where the magnetic path derived from the magnet 41 is biased by the sleeve flange 422 can be suppressed. The state of the magnetic path can be set to an intended state.

The shape of each of the facing region 43*c*1 and the exposed region 43*c*2 is an annular ring. The facing region 43*c*1 is located on the inside of the exposed region 43*c*2. The outer edge of the facing region 43*c*1 is the inner edge of the exposed region 43*c*2. The inner edge of the facing region 43*c*1 is the outer edge of the end ring through hole 43H. The outer edge of the exposed region 43*c*2 is the outer edge of the first end ring 43.

The shape of the single item of the second end ring 44 is the same as the shape of the single item of the first end ring 43. The second end ring 44 has an end ring through hole 44H. The second end ring 44 has an end ring inner peripheral surface 44*a*, an end ring outer peripheral surface 44*b*, an outer end ring end surface 44*c*, and an inner end ring end surface 44*d*. The second end ring 44 is not made to abut against the sleeve flange 422. Therefore, unlike the outer end ring end surface 43*c* of the first end ring 43, the entirety of the outer end ring end surface 44*c* of the second end ring 44 is an exposed region. The second end ring 44 faces the second magnet end surface 41*d* of the magnet 41. The magnet 41 is sandwiched between the first end ring 43 and the second end ring 44 along the direction of the rotation axis A. For the second end ring 44, a description of matter common to the first end ring 43 is omitted.

The shape of the armor ring 45 is a thin-wall cylinder. The armor ring 45 protects the magnet 41. As a result, the allowable rotation rate of the rotor 4 can be increased. The armor ring 45 contributes also to transmission of torque generated by the magnet 41 and the coil 51. The armor ring 45 is formed of a non-magnetic substance. The armor ring 45 may be formed of a titanium alloy.

The armor ring 45 has an armor ring through hole 45H. The inner sleeve 42, the magnet 41, the first end ring 43, and the second end ring 44 are placed in the armor ring through hole 45H. The armor ring 45 has an armor ring inner peripheral surface 45*a*, an armor ring outer peripheral surface 45*b*, a first armor ring end surface 45*c*, and a second armor ring end surface 45*d*.

The armor ring inner peripheral surface 45*a* defines the armor ring through hole 45H. The armor ring inner peripheral surface 45*a* faces the magnet outer peripheral surface 41*b*, the end ring outer peripheral surface 43*b* of the first end ring 43, and the end ring outer peripheral surface 44*b* of the second end ring 44. The armor ring inner peripheral surface 45*a* is fixed to the magnet outer peripheral surface 41*b* by adhesion or the like. The armor ring inner peripheral surface 45*a* is pressed against the end ring outer peripheral surface 43*b* and the end ring outer peripheral surface 44*b*. The armor ring outer peripheral surface 45*b* forms the outer peripheral surface of the rotor 4. The first armor ring end surface 45*c* protrudes along the direction of the rotation axis A more than the outer end ring end surface 43*c* of the first end ring 43. The armor ring 45 includes a portion 45*a*1 not surrounding the first end ring 43. The portion 45*a*1 not surrounding the first end ring 43 faces the outer peripheral surface of the sleeve flange 422. By this configuration, the rotation balance of the rotor 4 can be improved by cutting off part of the protruding portion of the end surface of the armor ring 45. The rotation balance of the motor rotor may be improved by cutting off part of the portion 45*a*1 not surrounding the first end ring 43 out of the end surface of the armor ring 45. As a result, the allowable rotation rate can be increased.

The second armor ring end surface 45*d* protrudes along the direction of the rotation axis A more than the outer end ring end surface 44*c* of the second end ring 44. The armor ring 45 includes a portion 45*a*2 not surrounding the second end ring 44. The portion 45*a*2 not surrounding the second end ring 44 faces the outer peripheral surface of the sleeve main body 421 of the inner sleeve 42. Also by this configuration, the rotation balance of the rotor 4 can be improved by cutting off part of the protruding portion of the end surface of the armor ring 45. The rotation balance of the motor rotor may be improved by cutting off part of the portion 45*a*2 not surrounding the second end ring 44 out of the end surface of the armor ring 45. As a result, the allowable rotation rate can be increased.

The inner sleeve 42 includes a cylindrical portion having a first outer diameter and a cylindrical portion having a second outer diameter larger than the first outer diameter. The cylindrical portion having the first outer diameter is the sleeve main body 421. The cylindrical portion having the second outer diameter is the sleeve flange 422. The magnet 41, the first end ring 43, and the second end ring 44 are placed on the sleeve main body 421. The first end ring 43 is made to abut against the sleeve flange 422. The inner sleeve 42 has a sleeve through hole 42H. The sleeve through hole 42H penetrates the sleeve main body 421 and the sleeve flange 422. The shaft 6 is placed in the sleeve through hole 42H.

Figure 3:
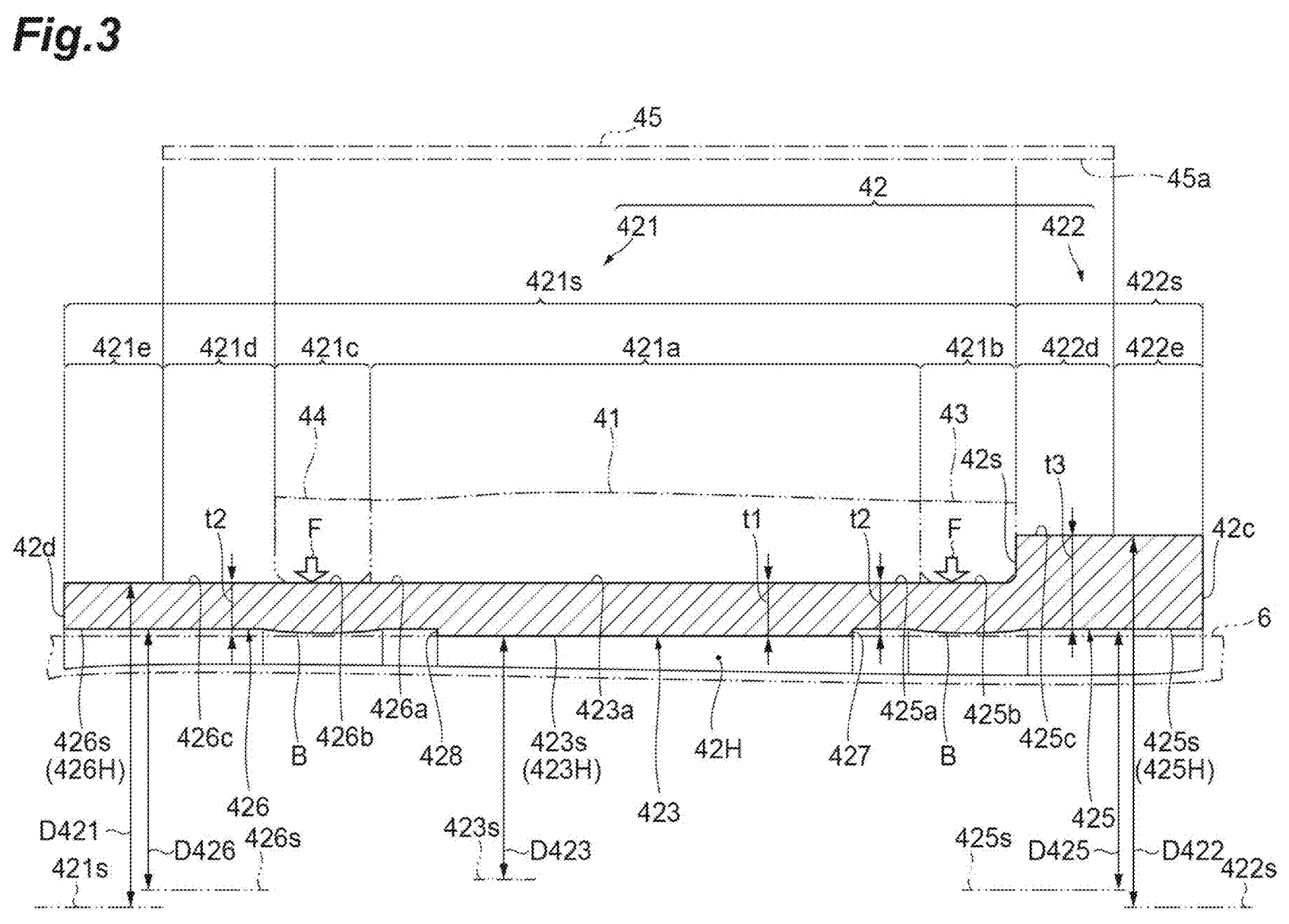

The inner sleeve 42 will now be described in more detail with reference to FIG. 3. The inner sleeve 42 may be formed of iron-based alloy steel for mechanical structure. The inner sleeve 42 may be formed of chromium molybdenum steel (SCM 435). The inner sleeve 42 may use a relatively lightweight material. The inner sleeve 42 may use a non-magnetic material. Examples of such materials include a titanium alloy and a ceramic material.

The inner sleeve 42 has a first sleeve end surface 42*c* and a second sleeve end surface 42*d*. The first sleeve end surface 42*c* is an end surface of the sleeve flange 422. The second sleeve end surface 42*d* is an end surface of the sleeve main body 421.

The inner sleeve 42 has a main body outer peripheral surface 421*s*, a flange outer peripheral surface 422*s*, and a flange abutment surface 42*s*.

The magnet 41, the first end ring 43, and the second end ring 44 are placed on the main body outer peripheral surface 421*s*. The main body outer peripheral surface 421*s* may include a magnet placement surface 421*a* on which the magnet 41 is placed, a first end ring placement surface 421*b* on which the first end ring 43 is placed, and a second end ring placement surface 421*c* on which the second end ring 44 is placed. The length of the sleeve main body 421 along the rotation axis A is longer than the total length of the magnet 41, the first end ring 43, and the second end ring 44 along the rotation axis A. Therefore, the main body outer peripheral surface 421*s* further includes an exposed portion on which the magnet 41, the first end ring 43, and the second end ring 44 are not placed. Further, the exposed portion includes a portion 421*d* facing the armor ring 45 and a portion 421*e* protruding from the second armor ring end surface 45*d* of the armor ring 45 and not facing the armor ring 45.

The magnet 41, the first end ring 43, and the second end ring 44 are not placed on the flange outer peripheral surface 422*s*. The flange outer peripheral surface 422*s* includes a surface 422*d* facing the armor ring 45 and a surface 422*e* not facing the armor ring 45. The surface 422*e* not facing the armor ring 45 protrudes from the first armor ring end surface 45*c* of the armor ring 45.

The flange abutment surface 42*s* is an end surface of the sleeve flange 422. The flange abutment surface 42*s* is caused by a difference between the outer diameter of the sleeve main body 421 and the outer diameter of the sleeve flange 422. The flange abutment surface 42*s* is oriented in the direction of the rotation axis A. The flange abutment surface 42*s* may spread in directions perpendicular to the rotation axis A. As a result, the flange abutment surface 42*s* faces the first end ring 43. The flange abutment surface 42*s* may simply be in contact with the first end ring 43. The flange abutment surface 42*s* may be actively fixed to the first end ring 43 by adhesion or the like. In short, the first end ring 43 placed on the sleeve main body 421 is in contact with the flange abutment surface 42*s* of the sleeve flange 422. Therefore, the position of the first end ring 43 and the position of the magnet 41 along the rotation axis A can be easily positioned.

The inner sleeve 42 has two portions distinguished in terms of function on the shaft 6. The inner sleeve 42 includes a holding portion 423, a first gap forming portion (e.g., a first gap portion 425), and a second gap forming portion (e.g., a second gap portion 426). The holding portion 423 holds the shaft 6. The holding portion 423 is fixed to the shaft 6. The holding portion 423 contributes to transmission of torque from the inner sleeve 42 to the shaft 6. The first gap portion 425 and the second gap portion 426 do not hold the shaft 6. The first gap portion 425 and the second gap portion 426 are not fixed to the shaft 6. The first gap portion 425 and the second gap portion 426 do not contribute to transmission of torque from the inner sleeve 42 to the shaft 6. As illustrated in FIGS. 2 and 3, a first gap portion 425 includes the sleeve flange 422 having an outer diameter larger than the outer diameter of the holding portion 423.

The holding portion 423 is provided substantially at the center of the inner sleeve 42 along the direction of the rotation axis A. The first gap portion 425 and the second gap portion 426 are provided to sandwich the holding portion 423 along the direction of the rotation axis A. The first gap portion 425 is provided on the side of the sleeve flange 422. The second gap portion 426 is provided on the side of the second sleeve end surface 42*d*.

Attention will now be paid to the relationship between the holding portion 423, the first gap portion 425, and the second gap portion 426, and the main body outer peripheral surface 421*s* and the flange outer peripheral surface 422*s*.

The magnet placement surface 421*a* includes the entire outer peripheral surface 423*a* of the holding portion 423. The magnet placement surface 421*a* includes a part 425*a* of the outer peripheral surface of the first gap portion 425 and a part 426*a* of the outer peripheral surface of the second gap portion 426. As a result, the magnet 41 is placed over the first gap portion 425, the holding portion 423, and the second gap portion 426.

The first end ring placement surface 421*b* is formed by a part 425*b* of the outer peripheral surface of the first gap portion 425. The first end ring 43 is placed on the first gap portion 425. The second end ring placement surface 421*c* is formed by a part 426*b* of the outer peripheral surface of the second gap portion 426. The second end ring 44 is placed on the second gap portion 426.

In the main body outer peripheral surface 421*s*, the portion 421*d* facing the armor ring 45 and the portion 421*e* not facing the armor ring 45 are formed by a part 426*c* of the outer peripheral surface of the second gap portion 426. In the flange outer peripheral surface 422*s*, the surface 422*d* facing the armor ring inner peripheral surface 45*a* and the surface 422*e* not facing the armor ring inner peripheral surface 45*a* are formed by a part 425*c* of the first gap portion 425.

The holding portion 423, the first gap portion 425, and the second gap portion 426 are provided with a through hole portion 423H, a through hole portion 425H, and a through hole portion 426H, respectively. The through hole portion 423H, the through hole portion 425H, and the through hole portion 426H are coaxial. The through hole portion 423H, the through hole portion 425H, and the through hole portion 426H receive the shaft 6. The through hole portion 423H, the through hole portion 425H, and the through hole portion 426H constitute one sleeve through hole 42H extending from the first sleeve end surface 42*c* to the second sleeve end surface 42*d*. The inner diameter D423 of the through hole portion 423H of the holding portion 423 is substantially the same as or slightly smaller than the outer diameter of the shaft 6. The first inner diameter (e.g., inner diameter D425) of the through hole portion 425H of the first gap portion 425 is clearly larger than the outer diameter of the shaft 6. Also the second inner diameter (e.g., inner diameter D426) of the through hole portion 426H of the second gap portion 426 is clearly larger than the outer diameter of the shaft 6. The inner diameter D425 of the through hole portion 425H of the first gap portion 425 is larger than the inner diameter D423 of the through hole portion 423H of the holding portion 423. Also the inner diameter D426 of the through hole portion 426H of the second gap portion 426 is larger than the inner diameter D423 of the through hole portion 423H of the holding portion 423. The inner diameter D425 of the through hole portion 425H of the first gap portion 425 is the same as the inner diameter D426 of the through hole portion 426H of the second gap portion 426. However, the inner diameter D425 of the through hole portion 425H of the first gap portion 425 may be different from the inner diameter D426 of the through hole portion 426H of the second gap portion 426.

Attention will now be paid to the wall thickness of the inner sleeve 42. The sleeve main body 421 has an outer diameter D421. The sleeve flange 422 has an outer diameter D422. The through hole portion 423H of the holding portion 423 has the inner diameter D423. The through hole portion 425H of the first gap portion 425 has the inner diameter D425. The through hole portion 426H of the second gap portion 426 has the inner diameter D426. The wall thickness of the inner sleeve 42 is determined by the combination of the outer diameter D421, the outer diameter D422, the inner diameter D423, the inner diameter D425, and the inner diameter D426. The inner sleeve 42 may have a first wall thickness t1, a second wall thickness t2, and a third wall thickness t3. The first wall thickness t1 is determined by the outer diameter D421 and the inner diameter D423. The second wall thickness t2 is determined by the outer diameter D421 and the inner diameter D425. The third wall thickness t3 is determined by the outer diameter D422 and the inner diameter D425. It is assumed that the inner diameter D426 and the inner diameter D425 are the same. Therefore, also the wall thickness determined by the outer diameter D421 and the inner diameter D426 is the second wall thickness t2.

The wall thickness of the holding portion 423 is the first wall thickness t1. The wall thickness of the first gap portion 425 is the second wall thickness t2 and the third wall thickness t3. A portion of the first gap portion 425 having the second wall thickness t2 corresponds to part of the sleeve main body 421 included in the first gap portion 425. A portion of the first gap portion 425 having the third wall thickness t3 corresponds to the sleeve flange 422 included in the first gap portion 425. The wall thickness of the second gap portion 426 is the second wall thickness t2.

When viewed from the magnet placement surface 421*a*, the first end ring placement surface 421*b*, and the second end ring placement surface 421*c*, the configuration is as follows. The wall thickness on the magnet placement surface 421*a* includes a portion having the first wall thickness t1 and a portion having the second wall thickness t2. Each of the wall thicknesses on the first end ring placement surface 421*b* and the second end ring placement surface 421*c* is the second wall thickness t2.

The inner sleeve 42 having the above configuration exhibits the following effects. A description will now be given with attention on the first end ring 43. The inner sleeve 42 exhibits similar effects also when attention is paid to the second end ring 44.

The first end ring 43 is press-fitted onto the sleeve main body 421. As a result, the first end ring placement surface 421*b* receives a force F along diameter directions. The first end ring placement surface 421*b* may receive, from the first end ring 43, a force F whereby the outer diameter of the first end ring placement surface 421*b* becomes smaller. The force F causes a slight deformation to the sleeve main body 421. The deformation of the sleeve main body 421 appears on the inner peripheral surface 425*s* of the through hole portion 425H of the first gap portion 425. A portion of the inner peripheral surface 425*s* on the opposite side to the first end ring placement surface 421*b*, which is the outer peripheral surface, slightly rises in the diameter direction toward the rotation axis A. This raised portion is referred to as a "bump B" for convenience of description.

In the place where the bump B has occurred, the inner diameter decreases by the height of the bump B. If it is assumed that the inner diameter before the bump B occurs coincides with the outer diameter of the shaft 6, the bump B may hinder the insertion of the shaft 6. When the height of the bump B is large, the shaft 6 cannot be inserted into the inner sleeve 42 in the first place. When the height of the bump B is low, the shaft 6 can be press-fitted into the inner sleeve 42. However, unintended distortion may occur due to the relative positional relationship between the inner sleeve 42 and the shaft 6.

Figure 4:
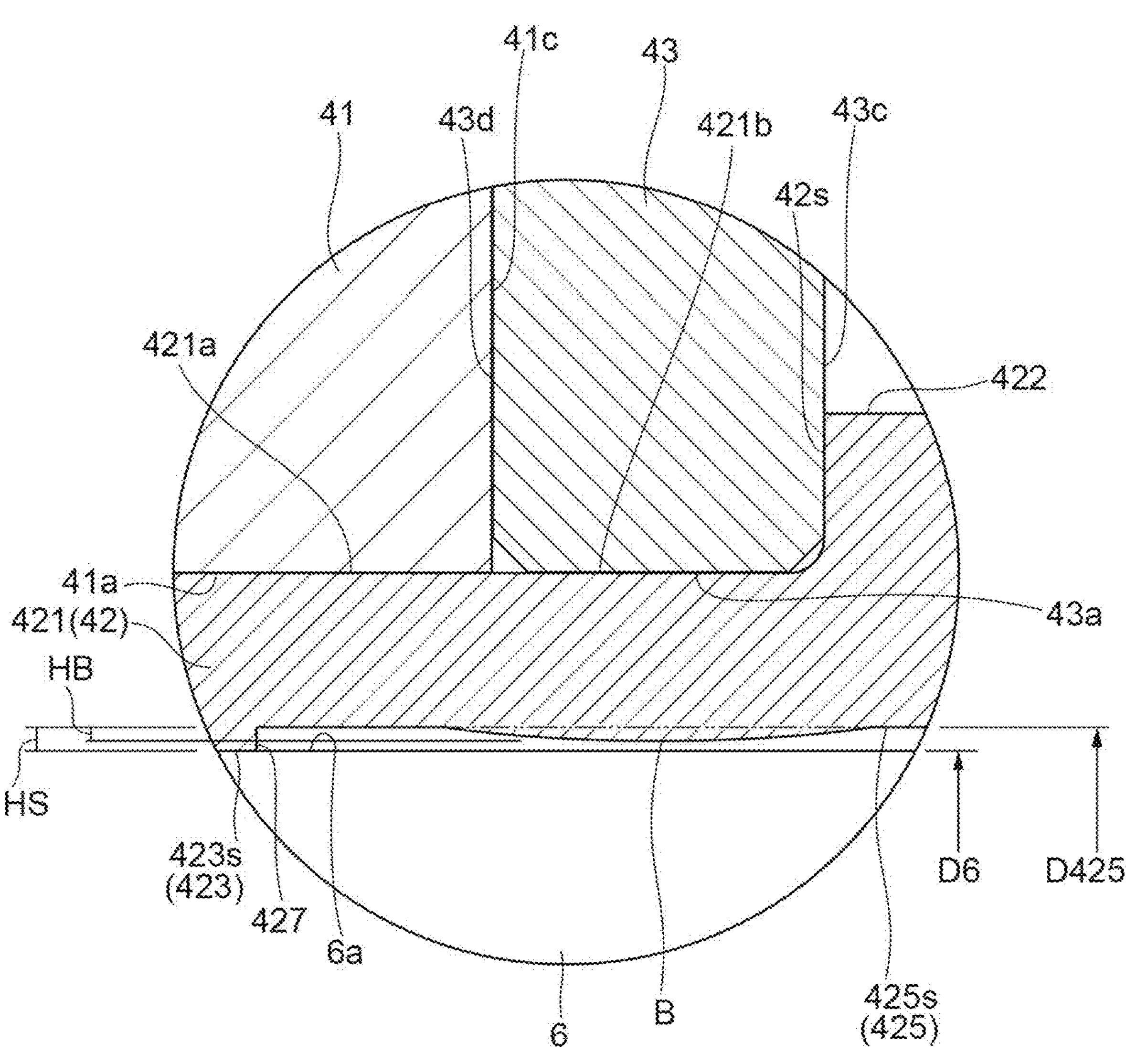
FIG. 4 is an enlarged cross-sectional view of a bump.
Figure 5:
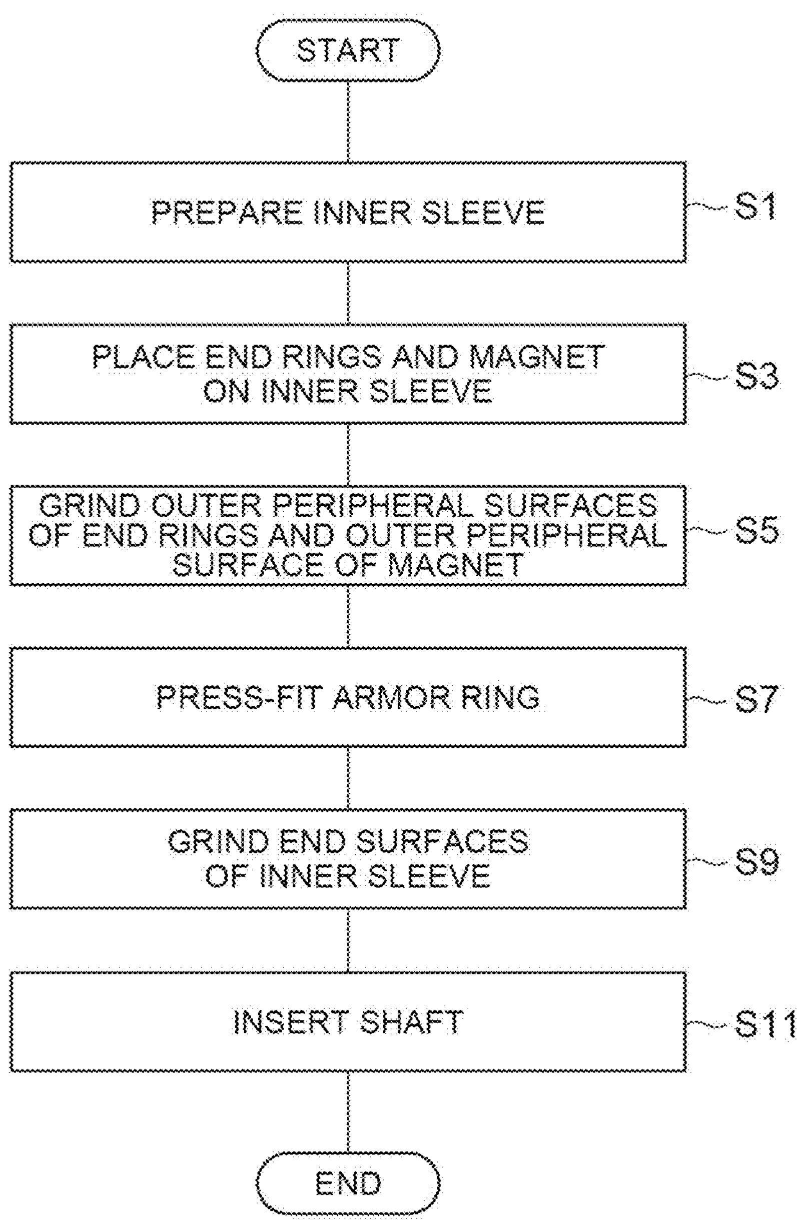
FIG. 5 is a flowchart showing an example rotor production method.

FIG. 4, which is an enlarged view of region P of FIG. 2, will now be referred to. For the inner sleeve 42, the inner diameter D425 of the place where the bump B will occur is set larger than the outer diameter D6 of the shaft 6 in advance. A gap HS exists between the outer peripheral surface 6*a* of the shaft 6 and the inner peripheral surface 425*s* of the first gap portion 425. As a result, even if the bump B occurs on the inner peripheral surface 425*s* of the first gap portion 425, the bump B does not come into contact with the outer peripheral surface 6*a* of the shaft 6 as long as the height HB of the bump B does not exceed the length of the gap HS. Therefore, the bump B resulting from the press-fitting of the first end ring 43 does not affect the insertion of the shaft 6 into the inner sleeve 42. As a result, assembly can be made such that the relative positional relationship between the inner sleeve 42 and the shaft 6 is set as intended.

In short, the first end ring 43 and the second end ring 44 are press-fitted onto the inner sleeve 42. The inner sleeve 42 that has undergone press-fitting is slightly deformed such that the inner diameter of the sleeve through hole 42H decreases. The first end ring 43 is placed on the first gap portion 425 of the inner sleeve 42. The second end ring 44 is placed on the second gap portion 426 of the inner sleeve 42.

Each of the first gap portion 425 and the second gap portion 426 includes a portion that is not in contact with the outer peripheral surface 6*a* of the shaft 6. Each of the inner diameters of the first gap portion 425 and the second gap portion 426 is larger than the inner diameter of the holding portion 423 that holds the shaft 6. It is assumed that, as a result, deformation occurs such that the inner diameters of the through hole portion 425H and the through hole portion 426H in which the shaft 6 is to placed decrease due to the press-fitting of the first end ring 43 and the second end ring 44. Even in this case, a situation where the bump B, which is a deformed part, protrudes further inward than the inner peripheral surface 423*s* of the holding portion 423 is suppressed. The bump B does not come into contact with the outer peripheral surface 6*a* of the shaft 6. Therefore, the deformation caused by the press-fitting of the first end ring 43 and the second end ring 44 can be tolerated. Furthermore, the shaft 6 can be held by the holding portion 423 as intended at the time of design.

As shown in FIG. 4, the first gap portion 425 is formed in the position where the first end ring 43 is placed and also in a portion of the position where the magnet 41 is placed. The bump B is basically formed on a region of the inner peripheral surface 425*s* located on the back surface of the first end ring placement surface 421*b*. However, the bump B may exceed the region located on the back surface. The first gap portion 425 may extend up to the back surface side of the magnet placement surface 421*a*. The boundary between the first gap portion 425 and the holding portion 423 can be defined by a level difference surface 427. The level difference surface 427 defining the distal end of the first gap portion 425 is formed more on the deep side (the magnet 41 side) than the first magnet end surface 41*c*. Also in the second gap portion 426, a level difference surface 428 (see FIG. 3) defining the distal end of the second gap portion 426 is formed more on the deep side (the magnet 41 side) than the second magnet end surface 41*d*.

The shape of the inner sleeve 42 further exhibits an effect of being able to omit part of the production process of the rotor 4. Next, a method for producing the rotor 4 is described with reference to FIGS. 5, 6, 7, and 8.

Figure 6A:
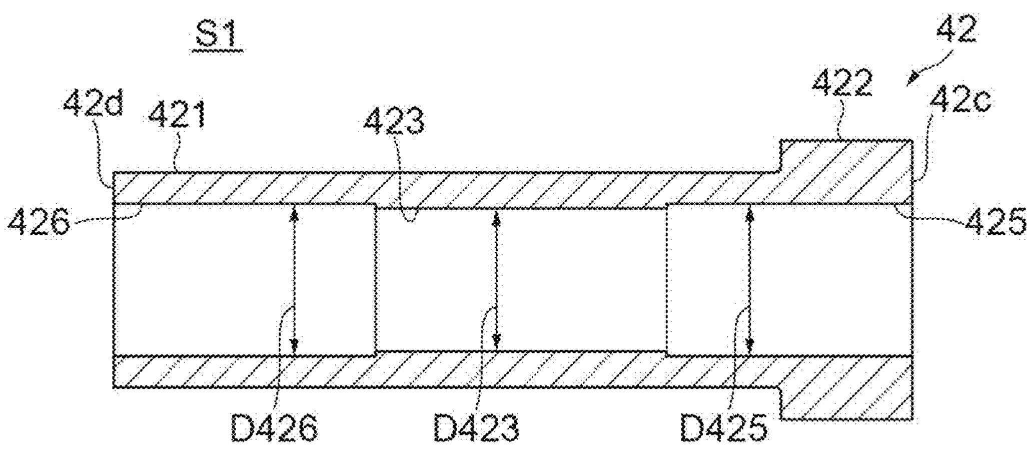
FIG. 6A is a diagram illustrating an example operation of preparing an inner sleeve.

An inner sleeve 42 is prepared (S1, see FIG. 6A). The outer peripheral surface of a columnar material is cut off to form a sleeve main body 421 and a sleeve flange 422. A through hole having an inner diameter D423 is provided in the material. Part of the through hole serves as a holding portion 423. In this work, the portion serving as the holding portion 423 is subjected to finish processing so as to satisfy desired dimensional accuracy. A hole having an inner diameter D425 is further provided from one end portion of the material. This hole, which serves as a first gap portion 425, is provided up to a desired depth from a first sleeve end surface 42*c*. Similarly, a hole having an inner diameter D426 is further provided from another end portion of the material. This hole, which serves as a second gap portion 426, is provided up to a desired depth from a second sleeve end surface 42*d*.

Figure 6B:
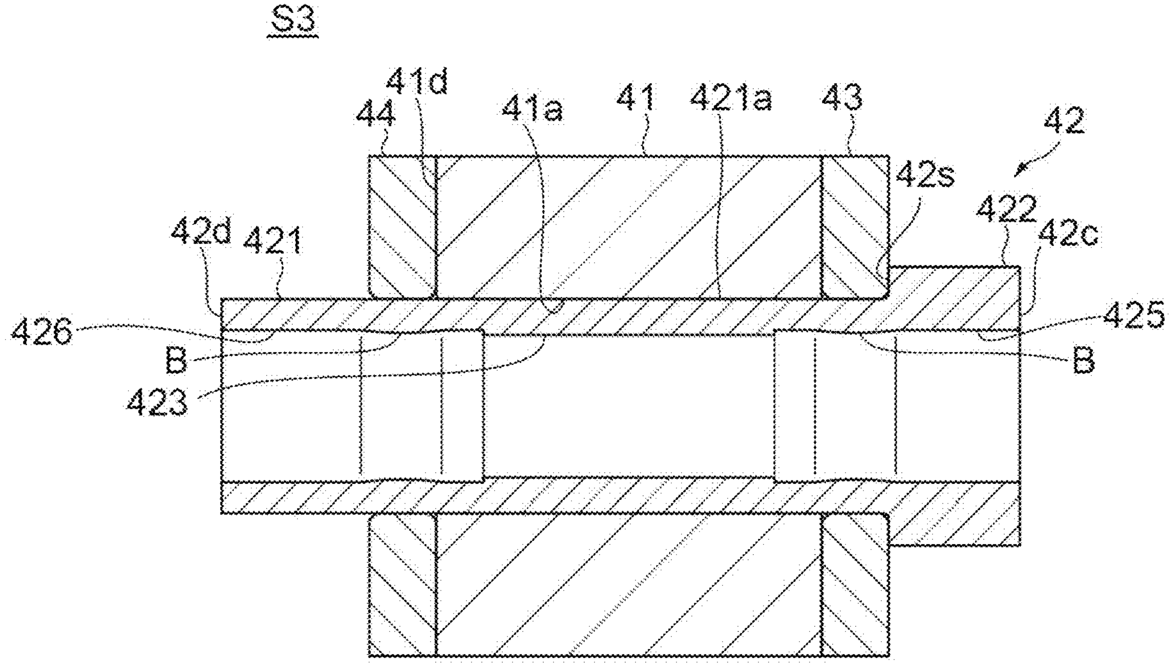
FIG. 6B is a diagram illustrating an example operation of placing end rings and a magnet on the inner sleeve.

A first end ring 43, a magnet 41, and a second end ring 44 are arranged in this order on the inner sleeve 42 (S3, see FIG. 6B). First, the first end ring 43 is press-fitted onto the sleeve main body 421 from the second sleeve end surface 42*d* side. Next, the first end ring 43 is made to abut against the flange abutment surface 42*s* of the sleeve flange 422. A first bump B occurs due to the placement of the first end ring 43. Next, the magnet 41 is inserted onto the sleeve main body 421 from the second sleeve end surface 42*d* side. Since the magnet 41 is bonded to the sleeve main body 421, an adhesive may be applied in advance to the magnet inner peripheral surface 41*a* or the magnet placement surface 421*a* of the sleeve main body 421. Next, the second end ring 44 is press-fitted onto the sleeve main body 421 from the second sleeve end surface 42*d* side. Then, the second end ring 44 is made to abut against the second magnet end surface 41*d*. A second bump B occurs due to the placement of the second end ring 44.

Figure 7A:
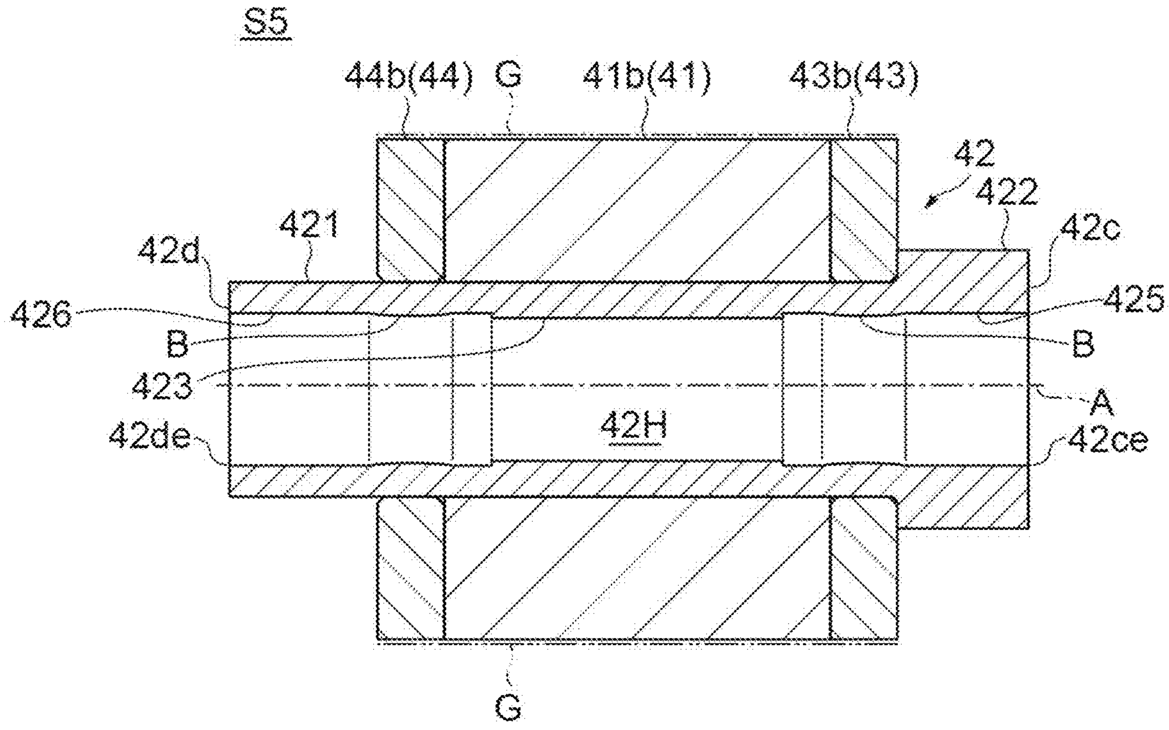
FIG. 7A is a diagram illustrating an example operation of grinding the outer peripheral surfaces of the end rings and the outer peripheral surface of the magnet.

The first end ring outer peripheral surface 43*b*, the magnet outer peripheral surface 41*b*, and the second end ring outer peripheral surface 43*b* are subjected to grinding G (S5, see FIG. 7A). In FIG. 7A, the alternate long and two short dashes line indicates the position where grinding is performed. First, what is called centering work is performed. A first opening edge 42*ce* and a second opening edge 42*de* of the sleeve through hole 42H are cut off so that, in grinding using a lathe, when rotation is performed in a state where a jig is inserted from both sides of the sleeve through hole 42H, the axis of rotation and the designed rotation axis A of the inner sleeve 42 coincide. After that, the first end ring outer peripheral surface 43*b*, the magnet outer peripheral surface 41*b*, and the second end ring outer peripheral surface 44*b* are subjected to grinding G. By the grinding G, the first end ring outer peripheral surface 43*b*, the magnet outer peripheral surface 41*b*, and the second end ring outer peripheral surface 44*b* coincide. The coincidence means that there is no significant level difference between the first end ring outer peripheral surface 43*b* and the magnet outer peripheral surface 41*b*. Further, the coincidence means that there is no significant level difference between the magnet outer peripheral surface 41*b* and the second end ring outer peripheral surface 44*b*.

Figure 7B:
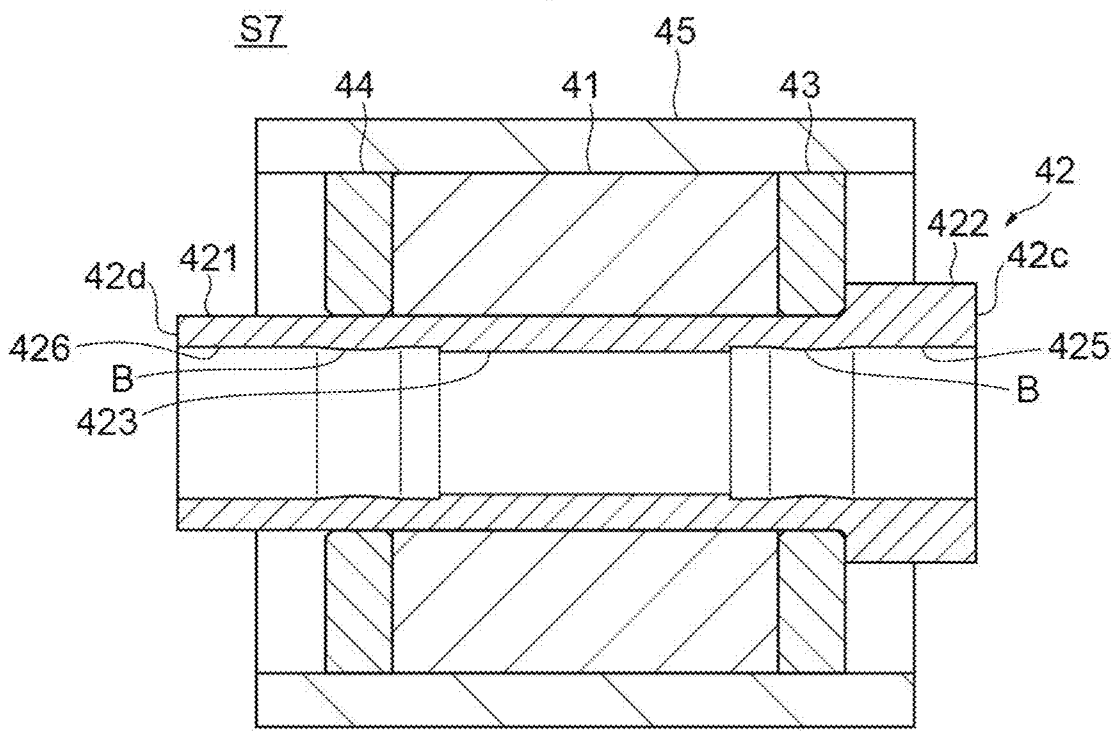
FIG. 7B is a diagram illustrating an example operation of press-fitting an armor ring.

An armor ring 45 is placed (S7, see FIG. 7B). The armor ring 45 is press-fitted onto the first end ring 43 and the second end ring 44. The first bump B and the second bump B may become larger due to the press-fitting of the armor ring 45.

Figures 8A, 8B:
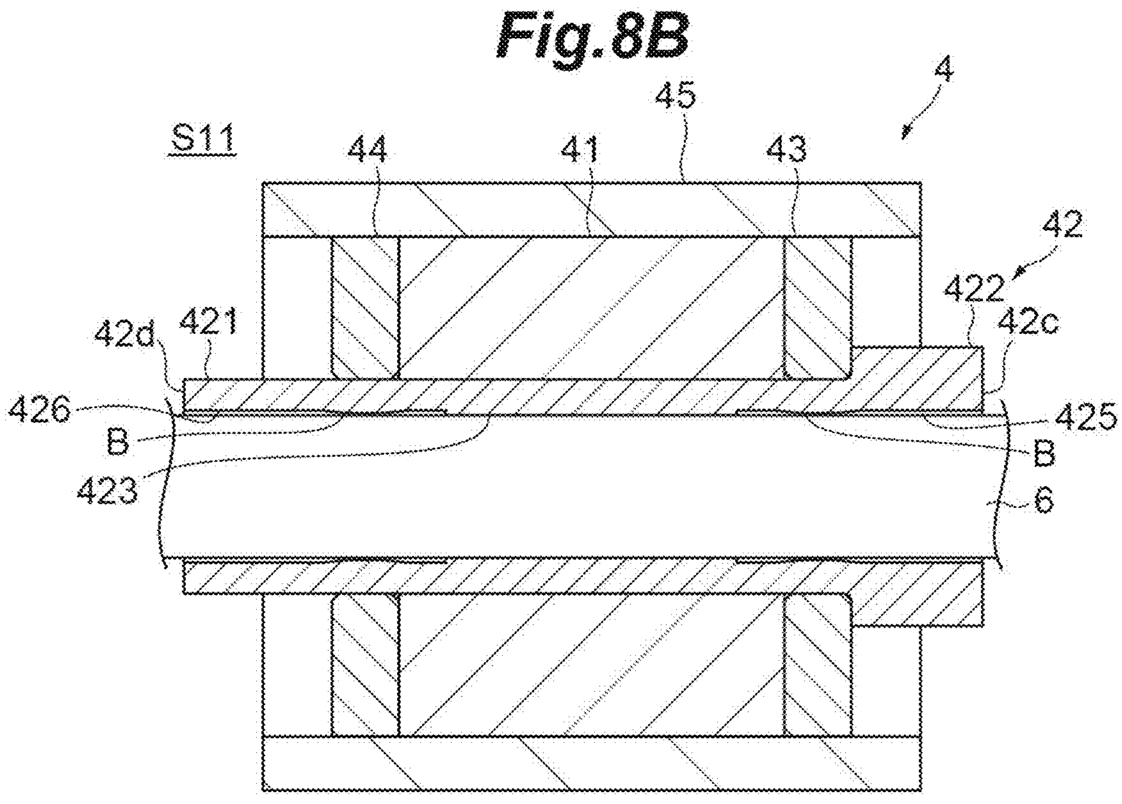
FIG. 8A is a diagram illustrating an example operation of grinding end surfaces of the inner sleeve.
FIG. 8B is a diagram illustrating an example operation of inserting a shaft.

The first sleeve end surface 42*c* is finished, and the second sleeve end surface 42*d* is finished (S9, FIG. 8A). "Finishing" means that, for example, grinding G is performed such that the first sleeve end surface 42*c* is orthogonal to the rotation axis A. It is already mentioned that the inner sleeve 42 is slightly deformed due to the press-fitting of the first end ring 43 and the second end ring 44. This deformation has been described as the first bump B and the second bump B. The deformation of the inner sleeve 42 resulting from the press-fitting is not limited to the first bump B or the second bump B. The first sleeve end surface 42*c* and the second sleeve end surface 42*d* may be slightly arcuately deformed due to the press-fitting. In operation S9, the first sleeve end surface 42*c* and the second sleeve end surface 42*d* distorted are subjected to grinding G. As a result, the end surfaces become orthogonal to the direction of the rotation axis A.

A shaft 6 is inserted into the sleeve through hole 42H of the inner sleeve 42 (S11, see FIG. 8B). The first bump B and the second bump B have occurred on the inner sleeve 42. However, the height HB (see FIG. 4) of the first bump B does not exceed the gap HS (see FIG. 4). As a result, the first bump B does not come into contact with the shaft 6. The same applies to the second bump B. Therefore, the shaft 6 is held by the holding portion 423 as intended.

Next, example modes of operations of the method for producing the rotor 4 are described.

The rotor 4 tolerates the presence of the bumps B resulting from the press-fitting of the first end ring 43 and the second end ring 44. Furthermore, the rotor 4 can suppress reductions in the accuracy of the shapes of the components constituting the rotor 4. On the other hand, it is also conceivable that a shaft may be placed in the inner sleeve after the bumps B are scraped off. A rotor production method of another example including an operation of scraping off the bumps B will now be described with reference to FIGS. 9A, 9B, 10A, 10B, 11, and 12.

Figure 9A:
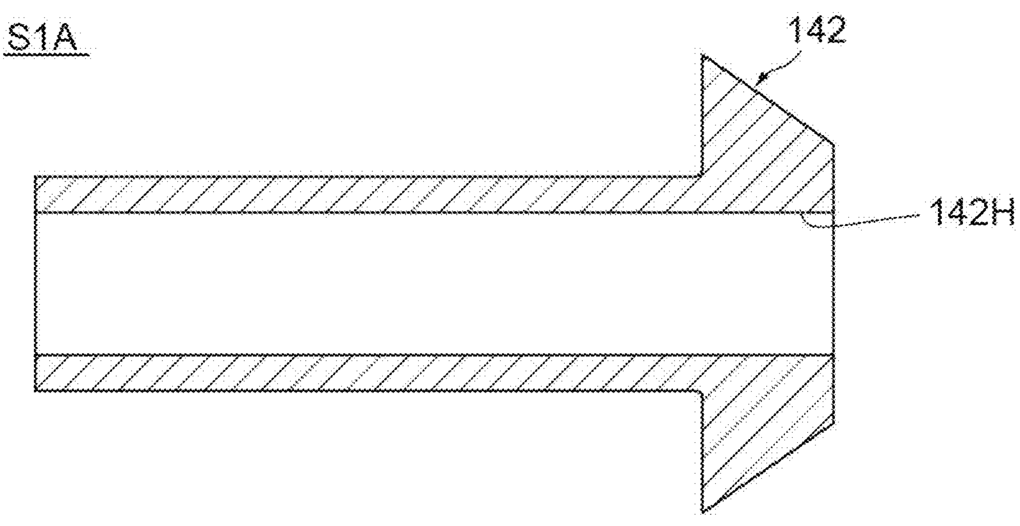
FIG. 9A is a diagram illustrating an example operation of preparing an inner sleeve.

An inner sleeve 142 is prepared (S1A, see FIG. 9A). In this operation S1A, a sleeve through hole 142H of the inner sleeve 142 is formed. The inner diameter of the sleeve through hole 142H is the same as that of the holding portion 423.

Figure 9B:
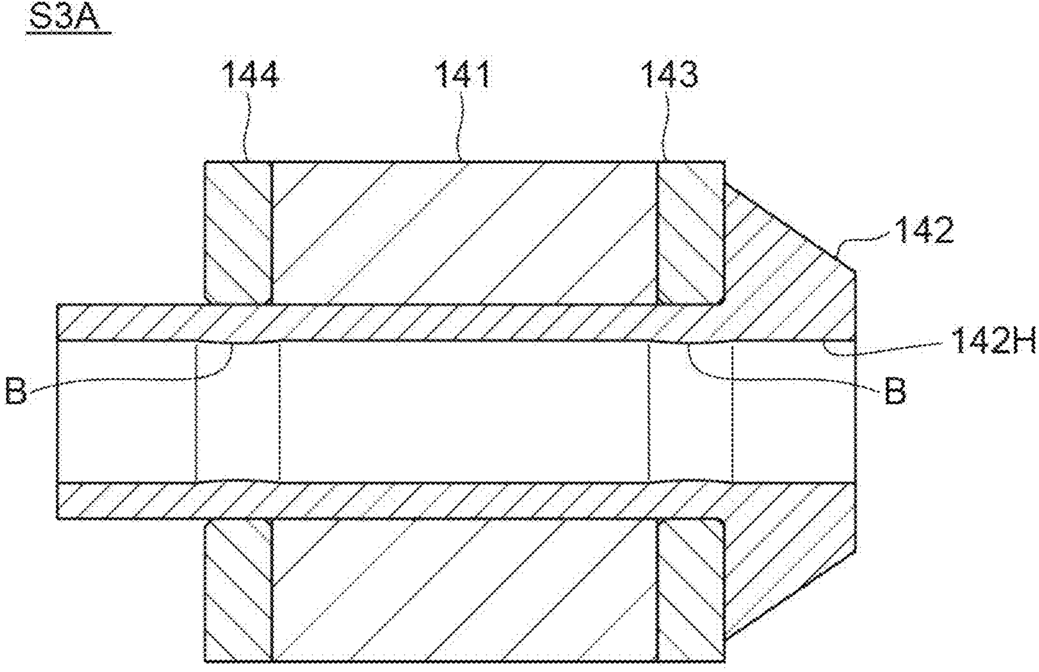
FIG. 9B is a diagram illustrating an example operation of placing end rings and a magnet on the inner sleeve.

A first end ring 143, a magnet 141, and a second end ring 144 are arranged in this order on the inner sleeve 142 (S3A, see FIG. 9B). A first bump B occurs due to the press-fitting of the first end ring 143. A second bump B occurs due to the press-fitting of the second end ring 144.

Figure 10A:
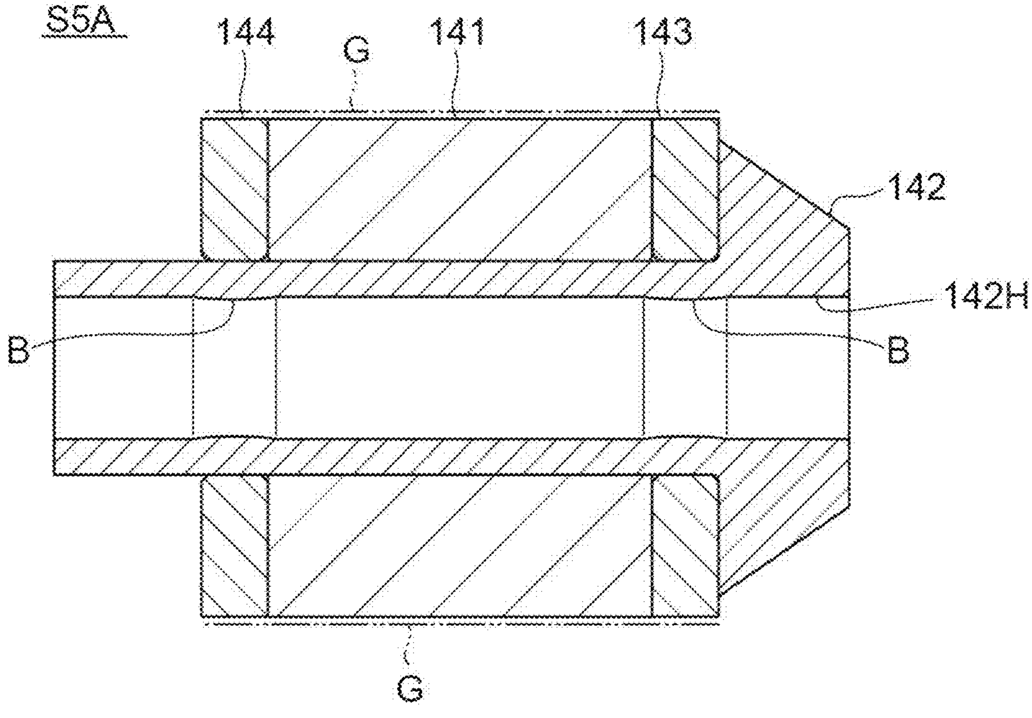
FIG. 10A is a diagram illustrating an example operation of grinding the outer peripheral surfaces of the end rings and the outer peripheral surface of the magnet.

The outer peripheral surfaces of the first end ring 143, the magnet 141, and the second end ring 144 are subjected to grinding G (S5A, see FIG. 10A). Centering work is performed, and then the outer peripheral surfaces of the first end ring 143, the magnet 141, and the second end ring 143 are subjected to grinding G.

Figure 10B:
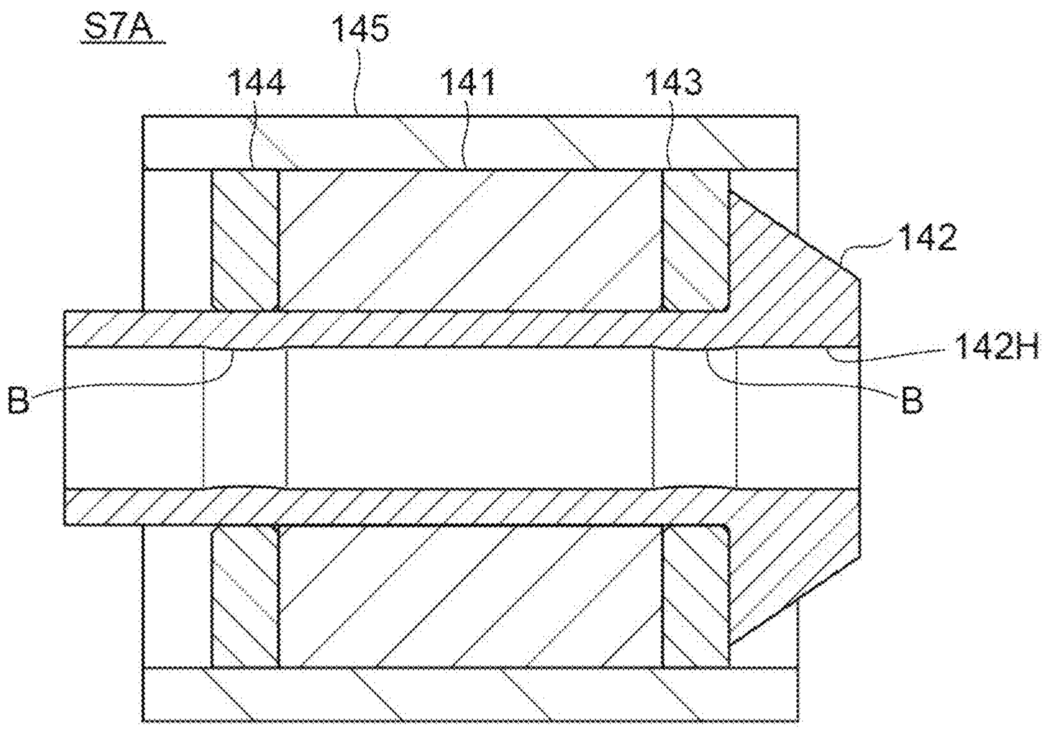
FIG. 10B is a diagram illustrating an example operation of press-fitting an armor ring.

An armor ring 145 is placed (S7A, see FIG. 10B).

In an example of the rotor production method illustrated in FIGS. 9A, 9B, 10A, 10B, 11A, 11B and 12, an operation of scraping off the bumps B is performed. The operation of scraping off the bumps B is almost the same as the operation of providing the sleeve through hole 142H. That is, the outer peripheral surface of the workpiece is held by a chuck. The workpiece is rotated by rotating the chuck. Also in the case where the workpiece is rotated using a chuck, the central axis of the workpiece and the rotation axis of the chuck is made to coincide. The chuck grips the outer peripheral surface of the workpiece. As preparation for the operation of scraping off the bumps B, the work of cutting off the outer peripheral surface of the armor ring 145 (S8A, see FIG. 11A) occurs.

A first sleeve end surface 142*c* is finished, and a second sleeve end surface 142*d* is finished. Further, the bumps B are scraped off (S9A, FIG. 11B).

In contrast, in the method for producing the rotor 4 illustrated in FIGS. 6A, 6B, 7A, 7B, 8A, and 8B, the work of scraping off the bumps B does not occur in the first place. Therefore, the work of cutting off the armor ring outer peripheral surface 45*b* of the armor ring 45, which is preparation work for performing the work of scraping off the bumps B, does not occur, either. In the rotor production method illustrated in FIGS. 6A, 6B, 7A, 7B, 8A, and 8B, one time of processing is sufficient for the portion that holds the shaft 6.

Figure 12:
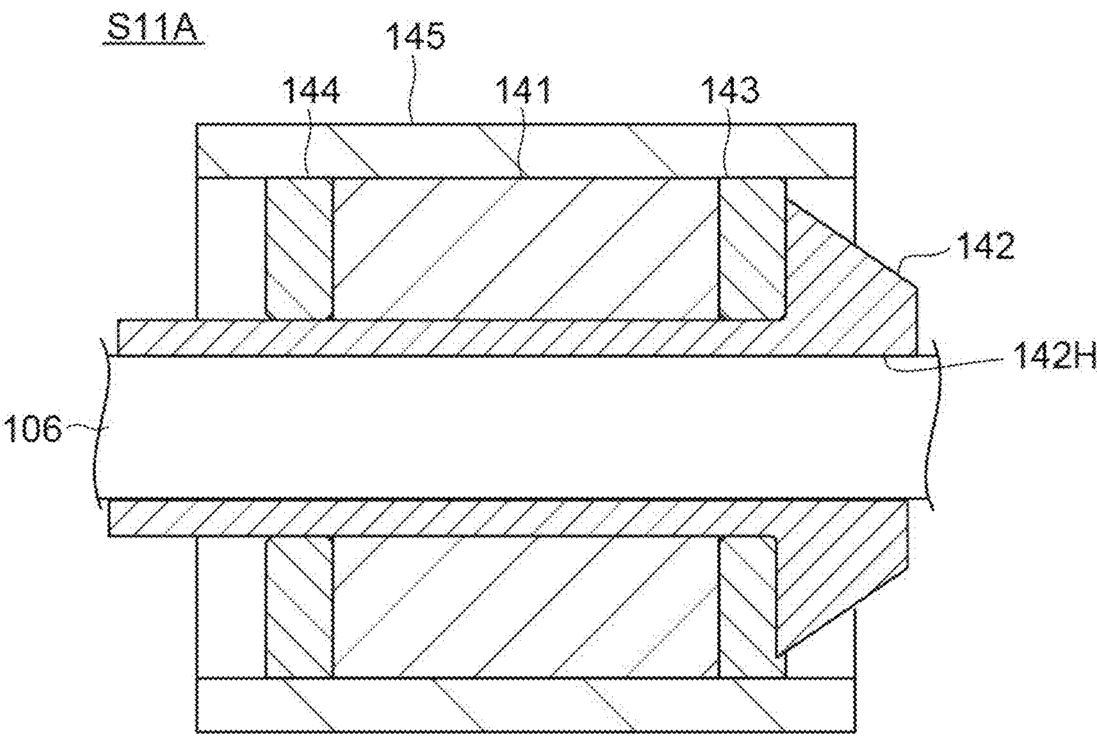
FIG. 12 is a diagram illustrating an example operation of inserting a shaft.

A shaft 106 is inserted into the sleeve through hole 142H of the inner sleeve 142 (S11A, see FIG. 12).

Figure 11A:
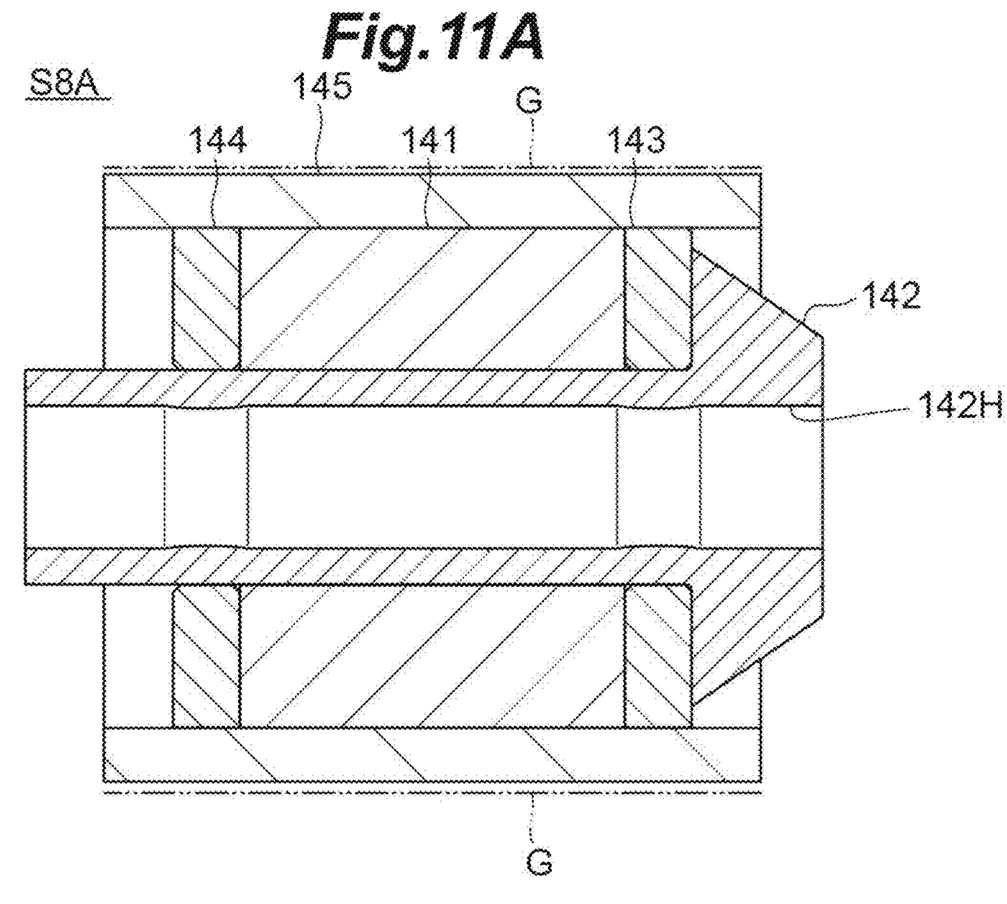
FIG. 11A is a diagram showing an example operation of grinding the outer peripheral surface of the armor ring.
Figure 11B:
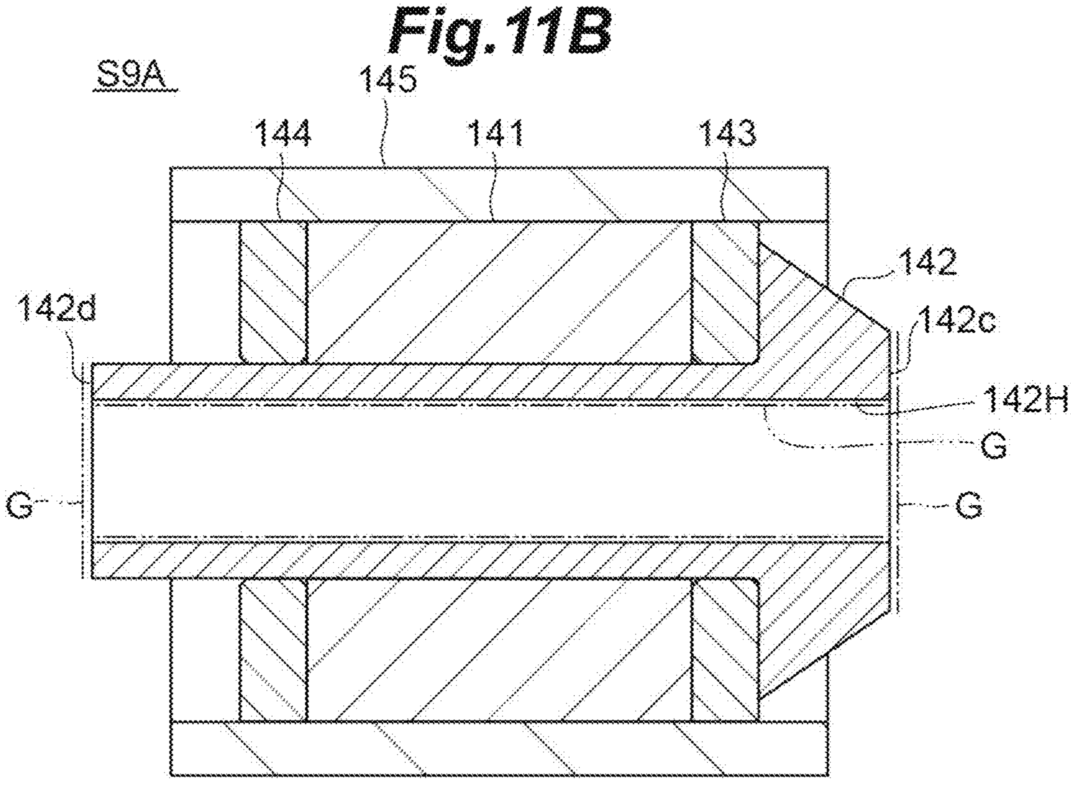
FIG. 11B is a diagram illustrating an example operation of an example of grinding end surfaces of the inner sleeve and scraping off bumps.

In the method for producing the rotor 4 illustrated in FIG. 11A, in the case where the bumps B are scraped off, the work of scraping off the bumps B and preparation work (S8A) for the scraping work occur. In contrast, in the method for producing the rotor 4 illustrated in FIG. 8A, the work of scraping off the bumps B does not occur. Then, preparation work (S8A) for the work of scraping off the bumps B does not occur, either. Therefore, the method for producing the rotor 4 illustrated in FIG. 8A may be reduce the number of work operations required to produce the rotor 4. As a result, the production cost of the rotor 4 may be reduced.

In the motor rotor production method illustrated in FIGS. 6A, 6B, 7A, 7B, 8A and 8B, an operation of removing a part deformed by the press-fitting of an end ring is not required. The number of operations required to produce the rotor can be reduced.

Some additional examples are disclosed as follows, with continued reference to the drawings for convenience of description.

An example motor rotor 4 may include: an inner sleeve 42 including a holding portion 423 configured to hold a shaft 6 having a rotation axis A and a gap portion 425,426 configured not in contact an outer peripheral surface 6*a* of the shaft 6; a magnet 41 having a cylindrical shape provided with a magnet through hole 41H into which the inner sleeve 42 is inserted; and an end ring 43,44 including an end ring through hole 43H,44H in which the inner sleeve 42 is placed and an end ring end surface 43*d*,44*d* that faces an end surface 41*c*,41*d* of the magnet 41, the inner sleeve 42 press-fitted into the end ring through hole 43H,44H. The holding portion 423 and the gap portion 425,426 may be individually provided with through hole portions 423H, 425H,426H communicating with each other, the through hole portions 423H,425H,426H configured to receive the shaft 6. An inner diameter of the through hole portion 425H, 426H provided in the gap portion 425,426 is larger than an inner diameter of the through hole portion 423H provided in the holding portion 423. The end ring 43,44 is located on the gap portion 425,426.

In the motor rotor 4, a part of the magnet 41 may be located on an outer peripheral surface 423*a* of the holding portion 423.

The motor rotor 4 may further include an armor ring 45 configured to cover an outer peripheral surface 6*a* of the magnet 41 and an outer peripheral surface 43*b*,44*b* of the end ring 43,44. The magnet 41 is located between the armor ring 45 and the holding portion 423.

In the motor rotor 4, an end surface 45*c*,45*d* of the armor ring 45 may protrude in a direction of the rotation axis A more than an end surface 43*d*,44*d* of the end ring 43,44.

In the motor rotor 4, the inner sleeve 42 may include a sleeve main body 421 including a magnet placement surface 421*a* on which the magnet 41 is placed and an end ring placement surface 421*b*,421*c* on which the end ring 43,44 is placed.

In the motor rotor 4, the holding portion 423 may include a part of the magnet placement surface 421*a*. The gap portion 425,426 may include a part of the magnet placement surface 421*a*.

In the motor rotor 4, the inner sleeve 42 may include a sleeve flange 422 having a larger outer diameter than an outer diameter of the sleeve main body 421. The sleeve flange 422 may include an abutment surface 42*s* configured to face an end surface 43*d*,44*d* of the end ring 43,44.

In the motor rotor 4, an outer peripheral surface 422*s* of the sleeve flange 422 may be a cylindrical surface, and an outer diameter of the sleeve flange 422 may be smaller than an outer diameter of the magnet 41.

In the motor rotor 4, an outer peripheral surface 425*a*, 426*a* of the gap portion 425,426 may include the magnet placement surface 421*a*, the end ring placement surface 42*b*,421*c*, and an outer peripheral surface of the sleeve flange 422.

In the motor rotor 4, a thickness from an inner peripheral surface 423*s* of the through hole portion 423H provided in the holding portion 423 to the magnet placement surface 421*a* may be larger than a thickness from an inner peripheral surface of the through hole portion 425H,426H provided in the gap portion 425,426 to the magnet placement surface 421*a*.

In the motor rotor 4, the gap portion 425,426 may include a sleeve flange 422 having a larger outer diameter than an outer diameter of the holding portion 423. a thickness from an inner peripheral surface of the through hole portion 425H,426H of the gap portion 425,426 to an outer peripheral surface provided in the sleeve flange 422 is larger than a thickness from an inner peripheral surface 423*s* of the through hole portion 423H provided in the holding portion 423 to the magnet placement surface 421*a*.

In the motor rotor 4, a material of the inner sleeve 42 is a non-magnetic substance.

An example motor rotor 4 may include a shaft 6, a magnet 41 located around the shaft 6, an inner sleeve 42 located around the shaft 6 and between the shaft 6 and the magnet 41, and an end ring 43,44 located around the inner sleeve 42 and positioned adjacent to the magnet 41. The inner sleeve 42 may include a holding portion 423 having an inner diameter that surrounds and holds the shaft 6, and a gap forming portion 425,426 including a first inner diameter that is larger than the inner diameter of the holding portion, such that the gap forming portion is spaced apart from the shaft 6. A part of the magnet 41 may be located on the holding portion 423. The end ring 43,44 may be located on the gap forming portion 425,426.

The motor rotor 4 may further include a second end ring 43,44 located around the inner sleeve 42 and positioned adjacent to the magnet 41. The magnet 41 is located between the end ring 43 and the second end ring 44.

In the motor rotor 4, the inner sleeve 42 may include a second gap forming portion 426 including a larger inner diameter than an inner diameter of the holding portion, and is spaced apart from the shaft 6, and the second end ring 44 is located on the second gap forming portion 426.

An example motor 3 may include the motor rotor 4 and a stator 5 including a coil 51 that surrounds the motor rotor 4.

An example electrical turbocharger 1 may include a motor 3 including the motor rotor 4 and a stator 5 including a coil 51 that surrounds the motor rotor 4; and an impeller 7 configured to be driven by the motor 3.

An example motor rotor production method may include preparing an inner sleeve 42 including a holding portion 423 configured to hold a shaft 6 having a rotation axis A and a gap portion 425,426 configured not to contact an outer peripheral surface of the shaft 6, placing, on the holding portion 423 of the inner sleeve 42, a magnet 41 having a cylindrical shape provided with a magnet through hole 41H into which the inner sleeve 42 is located, and press-fitting, onto the inner sleeve 42, an end ring 43,44 including an end ring through hole 43H,44H in which the inner sleeve 42 is placed and an end ring end surface 43*d*,44*d* that faces an end surface 41*c*,41*d* of the magnet 41, such that the end ring 43,44 is located on the gap portion 425,426 of the inner sleeve 42.

The method may further include, after placing the magnet 41 on the inner sleeve 42 and the press-fitting the end ring 43,44 onto the inner sleeve 42, placing an armor ring 45 configured to cover an outer peripheral surface of the magnet 41 and an outer peripheral surface of the end ring 43,44.

In the method, after press-fitting the end ring 43,44 onto the inner sleeve 42, placing the magnet 41 on the holding portion 423.

The method may further include placing an armor ring 45 around an outer peripheral surface of the magnet 41 and an outer peripheral surface of the end ring 43,44.

It is to be understood that not all aspects, advantages and features described herein may necessarily be achieved by, or included in, any one particular example. Indeed, having described and illustrated various examples herein, it should be apparent that other examples may be modified in arrangement and detail.

The electrical turbocharger 1 in which the rotor 4 is used is not limited to a vehicle. For example, the electrical turbocharger 1 may be used for an engine of a ship. The electrical turbocharger 1 may be used for other engines. The electrical turbocharger 1 is not limited to an internal combustion engine. The electrical turbocharger 1 may be used for a fuel cell system. The rotor 4 is not limited to use for the motor 3 used for the electrical turbocharger 1. The rotor 4 may be used for a device that simply functions as the motor 3. The rotor 4 may be used as a rotor of a generator.

What is claimed is:

1. A motor rotor comprising:

an inner sleeve including a holding portion configured to hold a shaft having a rotation axis and a gap portion configured not to contact an outer peripheral surface of the shaft;

a magnet having a cylindrical shape provided with a magnet through hole into which the inner sleeve is inserted; and an end ring including an end ring through hole in which the inner sleeve is placed and an end ring end surface that faces an end surface of the magnet, the inner sleeve press-fitted into the end ring through hole, wherein a part of the magnet is located on an outer peripheral surface of the holding portion, wherein the holding portion and the gap portion are individually provided with through hole portions communicating with each other, the through hole portions configured to receive the shaft, wherein an inner diameter of the through hole portion provided in the gap portion is larger than an inner diameter of the through hole portion provided in the holding portion, and wherein the end ring is located on the gap portion.

2. The motor rotor according to claim 1, further comprising an armor ring configured to cover an outer peripheral surface of the magnet and an outer peripheral surface of the end ring, wherein the magnet is located between the armor ring and the holding portion.

3. The motor rotor according to claim 2, wherein an end surface of the armor ring protrudes in a direction of the rotation axis more than an end surface of the end ring.

4. The motor rotor according to claim 1, wherein the inner sleeve includes a magnet placement surface on which the magnet is placed and an end ring placement surface on which the end ring is placed.

5. The motor rotor according to claim 4, wherein the holding portion includes a first portion of the magnet placement surface, and wherein the gap portion includes a second portion of the magnet placement surface.

6. The motor rotor according to claim 4, wherein the inner sleeve includes:

a sleeve main body; and a sleeve flange having an outer diameter that is larger than an outer diameter of the sleeve main body, and wherein the sleeve flange includes an abutment surface configured to face an end surface of the end ring.

7. The motor rotor according to claim 6, wherein an outer peripheral surface of the sleeve flange is a cylindrical surface, and wherein the outer diameter of the sleeve flange is smaller than an outer diameter of the magnet.

8. The motor rotor according to claim 7, wherein an outer peripheral surface of the gap portion includes the magnet placement surface, the end ring placement surface, and the outer peripheral surface of the sleeve flange.

9. The motor rotor according to claim 4, wherein a thickness from an inner peripheral surface of the through hole portion provided in the holding portion to the magnet placement surface is larger than a thickness from an inner peripheral surface of the through hole portion provided in the gap portion to the magnet placement surface.

10. The motor rotor according to claim 4, wherein the gap portion includes a sleeve flange having a larger outer diameter than an outer diameter of the holding portion, and wherein a thickness from an inner peripheral surface of the through hole portion of the gap portion to an outer peripheral surface of the sleeve flange is larger than a thickness from an inner peripheral surface of the through hole portion provided in the holding portion to the magnet placement surface.

11. The motor rotor according to claim 1, wherein a material of the inner sleeve is a non-magnetic substance.

12. A motor rotor comprising:

a shaft;

a magnet located around the shaft;

an inner sleeve located around the shaft and between the shaft and the magnet; and an end ring located around the inner sleeve and positioned adjacent to the magnet, wherein the inner sleeve includes:

a holding portion having an inner diameter that surrounds and holds the shaft; and a gap forming portion including a first inner diameter that is larger than the inner diameter of the holding portion, such that the gap forming portion is spaced apart from the shaft, wherein a part of the magnet is located on the holding portion, and wherein the end ring is located on the gap forming portion.

13. The motor rotor according to claim 12, further comprising a second end ring located around the inner sleeve and positioned adjacent to the magnet, wherein the magnet is located between the end ring and the second end ring.

14. A motor comprising:

the motor rotor according to claim 12; and a stator including a coil that surrounds the motor rotor.

15. An electrical turbocharger comprising:

a motor including the motor rotor according to claim 12 and a stator including a coil that surrounds the motor rotor; and an impeller configured to be driven by the motor.

16. The motor rotor according to claim 12, wherein the inner sleeve includes a magnet placement surface on which the magnet is placed, wherein the holding portion includes a first portion of the magnet placement surface, and wherein the gap forming portion includes a second portion of the magnet placement surface.

17. A motor rotor production method comprising:

preparing an inner sleeve including a holding portion configured to hold a shaft having a rotation axis and a gap portion configured not to contact an outer peripheral surface of the shaft;

placing, on the holding portion of the inner sleeve, a magnet having a cylindrical shape provided with a magnet through hole in which the inner sleeve is located; and press-fitting, onto the inner sleeve, an end ring including an end ring through hole in which the inner sleeve is placed and an end ring end surface that faces an end surface of the magnet, such that the end ring is located on the gap portion of the inner sleeve.

18. The motor rotor production method according to claim 17, wherein the magnet is placed on the holding portion after press-fitting the end ring onto the inner sleeve.

19. The motor rotor production method according to claim 17, further comprising placing an armor ring around an outer peripheral surface of the magnet and an outer peripheral surface of the end ring.

20. The motor rotor production method according to claim 17, further comprising, after press-fitting the end ring onto the inner sleeve, grinding an end surface of the inner sleeve.

* * * * *